United States Patent
Grubor et al.

(10) Patent No.: US 8,831,427 B2
(45) Date of Patent: Sep. 9, 2014

(54) DYNAMIC DATA-RATE ADAPTIVE SIGNAL PROCESSING METHOD IN A WIRELESS INFRA-RED DATA TRANSFER SYSTEM

(75) Inventors: Jelena Grubor, Berlin (DE); Volker Jungnickel, Berlin (DE); Klaus-Dieter Langer, Berlin (DE); Clemens Von Helmolt, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 2021 days.

(21) Appl. No.: 11/993,270
(22) PCT Filed: Apr. 26, 2006
(86) PCT No.: PCT/DE2006/000750
§ 371 (c)(1), (2), (4) Date: Jan. 24, 2011
(87) PCT Pub. No.: WO2006/136126
PCT Pub. Date: Dec. 28, 2006

(65) Prior Publication Data
US 2011/0110661 A1 May 12, 2011

(30) Foreign Application Priority Data
Jun. 24, 2005 (DE) .......................... 10 2005 030 299

(51) Int. Cl.
- H04B 10/00 (2013.01)
- H04B 10/12 (2006.01)
- H04B 17/00 (2006.01)
- H04B 10/114 (2013.01)

(52) U.S. Cl.
CPC .................................. H04B 10/1143 (2013.01)
USPC ............. 398/115; 398/183; 398/30; 398/130; 455/67.11

(58) Field of Classification Search
CPC .......................... H04B 10/1143; H04B 10/1123
USPC ........................................................... 398/115
See application file for complete search history.

(56) References Cited

U.S. PATENT DOCUMENTS 7,245,879 B2 * 7/2007 Sadri et al. ................. 455/67.11
7,643,444 B2 * 1/2010 Kim ............................. 370/328
(Continued)

FOREIGN PATENT DOCUMENTS

EP 1 578 044 A1 9/2005
EP 1 630 991 A1 3/2006
(Continued)

OTHER PUBLICATIONS

Thomas Keller et al., Adaptive Multicarrier Modulation: A convenient Framework for Time-Frequency Processing in Wireless Communications, Proceedings of the IEEE, IEEE, New York, US, vol. 88, No. 5, May 2000.

(Continued)

Primary Examiner — Ken Vanderpuye
Assistant Examiner — Amritbir Sandhu
(74) Attorney, Agent, or Firm — Brinks Gilson & Lione (57) ABSTRACT

An adaptive signal processing method to achieve an increase in capacity of data transfer systems, in which control data is returned via a backward channel. The method provides signal processing using an electrical sub-carrier sub-division according to frequency, the electrical sub-carrier with the lowest carrier frequency being permanently used as the backward channel (RC) for transferring control information relating to the current transfer quality of each sub-carrier. An electrical modulation on N parallel sub-carriers takes place in the transmitter (Tx) and then an optical intensity modulation is carried out for a serial data transfer in the optical channel (IRWC). The discrete division of the information to be transferred to the sub-carriers in a real-time operation can take place by the implementation of specific bit-loading algorithms.

18 Claims, 7 Drawing Sheets

(56) References Cited

U.S. PATENT DOCUMENTS

| | | | |
|---|---|---|---|
| 7,916,803 B2* | 3/2011 | Gardner et al. | 375/267 |
| 8,655,177 B2* | 2/2014 | Lowery et al. | 398/115 |
| 2002/0030871 A1* | 3/2002 | Anderson et al. | 359/150 |
| 2003/0153387 A1* | 8/2003 | Small et al. | 463/49 |
| 2005/0032514 A1* | 2/2005 | Sadri et al. | 455/423 |
| 2005/0201753 A1* | 9/2005 | Bai | 398/30 |
| 2005/0249506 A1* | 11/2005 | Fuse | 398/183 |
| 2005/0265730 A1* | 12/2005 | Yasue et al. | 398/183 |
| 2006/0039706 A1* | 2/2006 | Boh et al. | 398/183 |
| 2006/0285846 A1* | 12/2006 | Uekama et al. | 398/30 |
| 2006/0291544 A1* | 12/2006 | Fischer et al. | 375/219 |
| 2007/0213014 A1* | 9/2007 | Meacham et al. | 455/69 |
| 2011/0026924 A1* | 2/2011 | Chung et al. | 398/79 |
| 2011/0249978 A1* | 10/2011 | Sasaki | 398/140 |
| 2011/0286747 A1* | 11/2011 | Lowery et al. | 398/115 |
| 2012/0040622 A1* | 2/2012 | Ren et al. | 455/67.11 |
| 2012/0064834 A1* | 3/2012 | Mizusawa | 455/67.11 |

FOREIGN PATENT DOCUMENTS

| | | |
|---|---|---|
| JP | 10107759 | 4/1998 |
| JP | 2004-064561 | 2/2004 |
| JP | 2004-207901 | 7/2004 |
| JP | 2005-027107 | 1/2005 |
| WO | WO 2005/015866 A1 | 2/2005 |

OTHER PUBLICATIONS

Grubor, J et al., Capacity Analysis in Indoor Wireless Infrared Communication Using Adaptive Multiple Subcarrier Transmission, Transparent Optical Networks, 2005, Proceedings of 2005 7th International Conference Barcelone, Catlonia, Spain Jul. 3-5, 2005, Piscataway, NJ, USA, IEEE, Jul. 3, 2005, pp. 171-174.

Diana, L. et al, Rate-adaptive Modulation Techniques for Infrared Wireless Communications, Communications, 1999, ICC 99, 1999 IEEE, International Conference on Vancouver, BC, Canada, Jun. 6-10, 1999, Piscataway, NJ, USA, IEEE, US, Jun. 6, 1999, pp. 597-603.

Jungnickel V. et al., A Physical Model of the Wireless Infrared Communication Channel, IEEE Journal on Selected Areas in Communications, vol. 20, No. 3, Apr. 2002, pp. 631-640.

Hashemi, H. et al., Indoor Propagation Measurements at Infrared Frequencies for Wireless Local Area Networks Applications, Proceedings of Vehicular Technology Conference, vol. 43, No. 3, Aug. 1994, pp. 562-576.

Carruthers, C.B. et al., Angle Diversity for Nondirected Wireless Infrared Communication, IEEE Transactions on Communications, vol. 48, No. 6, Jun. 2000, pp. 960-969.

Jungnickel, V., Electronic Tracking for Wireless Infrared Communications, IEEE Transactions of Wireless Communications, vol. 2, No. 5, Sep. 2003, pp. 989-999.

Garrido-Balsells, J.M. et al., Performance Evaluation of Rate-Adaptive Transmission Techniques for Optical Wireless Communication, Proceedings of Vehicular Technology Conference, pp. 914-918, 2004.

Matsuo, M. et al., Rate-Adaptive Indoor Infrared Wireless Communications Systems Using Punctured Convolutional Codes and Adaptive PPM, The Ninth IEEE International Symposium on Personal, Indoor and Mobile Radio Communications, vol. 2, Sep. 1-8, 1998, pp. 693-697.

Tavares, A. et al., Angle Diversity and Rate-Adaptive Transmission for Indoor Wireless Optical Communications, Communications Magazine, IEEE, vol. 41, Issue 3, Mar. 2003, pp. 64-73.

Grubor, Jelena, Jungnickel, Volker, Langer, Klaus-Dieter, Rate-Adaptive Multiple Sub-carrier-Based Transmission for Broadband Infrared Wireless Communication, NFOEC, Anaheim USA, 2006.

Grubor, Jelena, Jungnickel, Volker, Langer, Klaus-Dieter, Adaptive-Modulation Technique in Wireless Infrared Indoor Communications, ITG Photonische Netze, Leipzig, 2006.

Grubor, Jelena, Jungnickel, Volker, Langer, Klaus-Dieter, Bit-Loading for Modulation-Adaptive Transmission in Infrared Wireless Indoor Communication, IEE ICAT, Cambridge, UK, 2006.

Japanese Office Action, dated Feb. 15, 2011, pp. 1-2, Japanese Application No. 2008-517306.

* cited by examiner

DYNAMIC DATA-RATE ADAPTIVE SIGNAL PROCESSING METHOD IN A WIRELESS INFRA-RED DATA TRANSFER SYSTEM

BACKGROUND

The present invention relates to a dynamic data-rate adaptive signal processing method for transferring data signals with a predetermined signal power in a wireless infra-red data transfer system comprising an undirected, bidirectionally operable optical transfer channel involving infra-red light with a predetermined frequency between an stationary transmitter and a mobile receiver in an interior room The advantages offered by infra-red transfer—a very large, free and available bandwidth, no interfering superposition with radio systems, utilization of the same operating frequencies in adjacent transmission systems, high data security, defined limitation of the data transfer by walls—make it a useable and attractive technology for interior communication, such as in offices, hospitals or airplanes In the research field of wireless undirected infra-red indoors communication known systems achieve high data rates by angularly or spatially directed diversity. Optical diversity systems known from the prior art, however, require relatively complex optical systems (angularly diverse receivers or multi-beam transmitters or both). Thus, electronic signal processing methods used for improving radio systems are reasonable in infra-red transfer. However, since these two media comprise fundamentally different properties, a simple application of the known radio channel techniques for the infra-red channel cannot be carried out, but requires an investigation of its own. Due to the high dynamics with regard to bandwidth and power of the transfer response of the infra-red channel, which primarily depends upon the quality of the line of sight (LOS) between transmitter and receiver, it is difficult to achieve a good signal-noise-ratio for high data rates while using appropriate data signal power. In order to ensure user utilization and user mobility without signal interruptions, the known infra-red systems are statically configured in such a way that a reliable signal propagation is achieved indoors. The system is thereby configured for the worst propagation case. This, however, leaves a high amount of channel capacity available under good transfer conditions unused. However, in order to maximize the system data rate while at the same time ensuring secure transfer and full room coverage, the transfer system has to be configured adaptively with regard to the data transfer rate, i.e. it has to be dynamized. If the transfer channel behaviour is known, this allows for a reduction of the transfer rate under disadvantageous conditions until a predetermined error probability is reached. In adaptive signal processing, data are processes and transferred with reference to time or frequency based on a channel estimate. The current channel properties are returned from the receiver to the transmitter according to the time or frequency reference via a backchannel, where they are integrated into the adaptive signal processing. An adaptive system thus represents a closed control loop and results in an automatic adjustment of the data transfer rate in the time or frequency range depending on the current transfer quality within the channel. By configuring the system for the current channel state and not for the worst channel state, a considerably higher data rate and improved utilization of the signal power may be achieved.

PRIOR ART

A physical model of the wireless indoors infra-red data transfer system with an undirected optical transfer channel between a stationary transmitter and a mobile receiver is known from publication I "A Physical Model of the Wireless Infrared Communication Channel" by V. Jungnickel et al. (in IEEE Journal on Selected Areas in Communications, Vol. 20, No. 3, April 2002, p. 631-640). Measurements carried out for such a communication system have already been published in publication II "Indoor Propagation Measurements at Infrared Frequencies for Wireless Local Area Networks Applications" by H. Hashemi et al. (in Proc. Of Vehicular Technology Conference, Vol. 43, No. 3, August 1994, pp. 562-576). The use of multi-transmitters in combination with angularly diverse receivers of achieving angular diversity in an undirected optical transfer channel is known from publication III "Angle Diversity for Nondirected Wireless Infrared Communication" by J. B. Carruthers et al. (in IEEE Transactions on Communications, Vol. 48, No. 6, June 2000, pp. 960-969). Disclosed is a method comprising a static indoor channel having a worst case transfer configuration. Thereby, disadvantages can on the one hand be seen in the unsatisfactory utilization of the available channel capacity and on the other hand in the relatively large time and effort invested in equipment due to a tracing system and complex optics. The demand for an efficient utilization of the channel capacity leads to the configuration of an adaptive system. The establishment of directed connections between transmitter and receiver by means for tracing tracking systems in order to achieve a spatial diversity is known from publication IV "Electronic Tracking for Wireless Infrared Communications" by V. Jungnickel et al. (in IEEE Transactions of Wireless Communications, Vol. 2, No. 5, September 2003, pp. 989-999). Thereby, the possibility of switching between two modes (direct and diffuse) are described which, although allowing for better utilization of the channel capacity, still requires a complex electronic tracking and pointing system. By achieving system adaptivity exclusively by signal processing, it is possible to achieve high transfer rates with an effective utilization of the channel capacity without complex electronics.

So far in known infra-red systems, a data-rate adaption is processed in the time range by means of a serial baseband transmission. A change of the transfer rate is achieved by adaptive coding by means of variable code lengths or rates (cf. publication V "Rate-Adaptive Modulation Techniques for Infrared Wireless Communication" by L. Diana et al. (in Proc. of IEEE Intl. Conf. On Communications, Vancouver, B.C., Canada, pp. 597-603, June 1999) and publication VI "Performance Evaluation of Rate-Adaptive Transmission Techniques for Optical Wireless Communication" by J. M. Garrido-Balsells et al. (in Proc. Of Vehicular Technology Conference, pp. 914-918, 2004) or by combining adaptive coding and performance efficient modulation (degree of the L-PPM) (cf. publication VII "Rate-Adaptive Indoor Infrared Wireless Communications Systems Using Punctured Convolutional Codes and Adaptive PPM" by M. Matsuo et al, 1998. The Ninth IEEE International Symposium on Personal, Indoor and Mobile Radio Communications, Volume 2, 8-1 September 1998, pp. 693-697, vol. 2). However, such a broad baseband transfer is very vulnerable towards inter-symbol-interference due to the multiple path propagation in an infra-red system. Moreover, an adaptive adjustment in form of complex signal processing at the receiver is required. Furthermore, systems are proposed relating to a combination of adaptive serial transfer and angular diversity (cf. publication VIII "Angle diversity and rate adaptive transmission for indoor wireless optical communications" by A. Tavares et al., Communications Magazine, IEEE Volume 41, Issue 3, March 2003, pp. 64-73). However, this again requires complex optics in order to generate the diversity and for the adaptive adjustment of the serial transfer. Applications for infra-red transfer systems for a data-rate adaptive transfer in the time range may be gathered from the above-mentioned publications V and VI, which form the closest prior art for the present invention. In these documents, however, the adaptive adjustment of the data rate is exclusively performed in the time range by adjusting the transfer rate of the serial data, their block-wise identification involving a change of the block rate, the variation of the code word length or the complex coding in order to change the data rate.

In radio-based wireless communication systems, adaptive signal processing is known as involving the advantages of an adjustment to the propagation conditions and of larger transfer capacities in the time as well as in the frequency range. Thereby, the required backchannel is also constantly redefined depending on the current channel quality. Indeed, it is not easy to draw a comparison by analogy between radio systems and optical systems as the channels exhibit basically different transfer properties (radio channel: modulation by changing the field strength (signal amplitude), complex positive and negative values are possible, optical channel: only real positive values are possible, direct modulation merely by modifying light intensity, i.e. of the amplitude of the optical power. The differentiation of the adaptivity in the time and in the frequency range depends on whether the user receives the data serially on a single frequency (time approach) or split up in parallel into different frequencies (frequency approach). In the radio channel, these two methods are referred to as single carrier and multiple carrier transfer technique. In an optical infra-red system operating with one wavelength only one optical carrier exists. This optical carrier may be directly modulated with serial data (baseband transfer corresponding to the single carrier technique in the radio channel). Another method consists in at first dividing up the electrical data stream in order to modulate a plurality of electrical carriers in parallel. This entire modulated electrical signal may then be used to modulate the optical carrier (multiple carrier modulation corresponding to the multiple carrier modulation in the radio channel)

A detailed description of adaptive signal processing in the frequency range for a radio channel may be gathered from publication IX: "Adaptive Multicarrier Modulation: A Convenient Framework for Time-frequency Processing in Wireless Communications" by Th. Keller et al. (in IEEE Proc. Of the IEEE, Vol. 88, No. 5, May 200, pp. 611-640). It also becomes clear from the algorithms used in the mentioned publications that a simple analogy between a radio channel and an optical channel is impossible.

Adaptive signal processing by means of a multiple carrier is referred to as DMT (discrete multi-tone) for the wired electrical transfer channel, as AOFDM (adaptive orthogonal frequency division multiplexing) for the wireless radio channel and as MOSM-IR (multiple orthogonal subcarrier modulation) for the optical transfer channel, whereby herein one additional functional block is respectively required on the transmitter and on the receiver side for intensity modulation or for direct detection, respectively. In wireless systems, the point is basically to minimize signal distortions caused by multiple path propagation. Thereby, the same techniques are used (multiple carrier, adaptive selection of the modulation format for each carrier, backchannel for the control information), whereby DMT is to suppress crosstalk and AOFDM is to suppress multiple path propagation. In both techniques, multiple carriers are used in order to solve various physical problems occurring in the physically different transfer channels.

OBJECT

Thus, the object of the present invention is to further develop the above-described generic signal processing method in such a way that an adaptive signal processing in a wireless infra-red data transfer system, in which—as is generally known—the properties of the optical transfer channel vary in a large frequency range, may also be carried out in the frequency range in order to achieve the advantages associated with radio channels due to adaption in the frequency range for the optical transfer channels, as well. The inventive solution for this object may be taken from the claims and will be explained in more detail in the following description of the invention.

SUMMARY

Thereby, it is provided for the generic dynamic data-rate adaptive signal processing method for the transfer of data signals having a predetermined signal power in a wireless infra-red data transfer system with an undirected bi-directionally operable optical transfer channel involving infra-red light of a predetermined frequency between a stationary transmitter and a mobile receiver in an interior room that the electrical data signal is subdivided into a number N of parallel data signal streams and assigned to a plurality of orthogonal electrical sub-carriers having differing sub-carrier frequencies, the data rate of the data signal streams to be currently transferred is determined for each electrical sub-carrier by individually selecting a modulation format and the data transfer rate in a quasi continuous manner depending on the respective transfer quality of the sub-carrier, the optical signal power being distributed to the individual sub-carriers in compliance with safety-related provisions, the intensity of the infra-red light to be sent may be directly modulated according to the selected modulation formats after parallel-to-serial conversion, at the receiver, the serially transferred optical signal is directly detected in the baseband, the number N of parallel electrical data signal streams is demodulated, each electrical data signal stream is separately processed, and that the sub-carrier having the lowest sub-carrier frequency is permanently used as backchannel from the receiver to the transmitter in order to transfer control information concerning the current transfer quality of each sub-carrier for the adaptive determination of the data rate to be currently transferred in each sub-carrier.

The inventive data-rate adaptive signal processing method comprising a dynamic detection of the current transfer rate for each subcarrier for the first time allows for a data processing in the frequency range for optimizing the transfer in a simple optical transfer system without complex optical or electronic components. The improvement of the transfer which is bi-directionally possible in the transfer channel is exclusively achieved by means of signal processing. Orthogonal electrical subcarriers are multiplexed in the frequency range. The modulation and correspondingly the demodulation of the data signals is carried out in two steps. In the transmitter, at first an electrical and subsequently an optical modulation is carried out. On the receiver-side, demodulation takes place in an inverted order. Furthermore, an additional adaptive coding of the subcarrier may be carried out when considering a non-encoded transfer. The transfer capacity provided by the channel is used efficiently: under good transfer conditions, very high data rates may be transferred, and under bad transfer conditions, the data rates are reduced. The result is a cost-benefit-optimized optical transfer channel with high quality of service (QoS). In the inventive method, the backchannel is permanently turned over to the electrical sub-carrier with the lowest transfer-ensuring sub-carrier frequency. This allocation may reliably ensure a permanent feedback in the system which may be easily verified. If the backchannel is purposely interrupted, the adaption failure is immediately evident from an abrupt deterioration of the signal transfer and thus, the effectiveness of the adaption system is immediately evident, as well. An analyzer in the backchannel may detect how control information changes when the transfer channel changes.

It was the object of the inventive method to solve the problem of solving the multiple path propagation in a wireless connection by means of an infra-red channel (having positive real values of the light intensity), thus aggravating the conditions for the optical signal to be transferred when compared to known transfer methods. By sub-dividing into N parallel sub-carriers, the transfer rate per sub-carrier may be reduced which is equivalent with a low bandwidth. Thereby, the influence on the inter-symbol-interference may be reduced, which has a positive effect on the receiver in which only a simple signal processing has to be performed. Further details of the inventive method may be gathered from the specific descriptive part. This also contains explanations with regard to the embodiments of the signal processing method which concern the actual selection of the modulation formats for each sub-carrier according to a bit-loading algorithm under real operating conditions (momentary channel noises, maximum admissible optical signal power, admissible BER).

BRIEF DESCRIPTION OF THE DRAWINGS

The functionality of the inventive data-rate adaptive signal processing method is explained in the following in conjunction with the schematic Figures.

DESCRIPTION OF PREFERRED
EMBODIMENTS EXAMPLES

Figure 1:
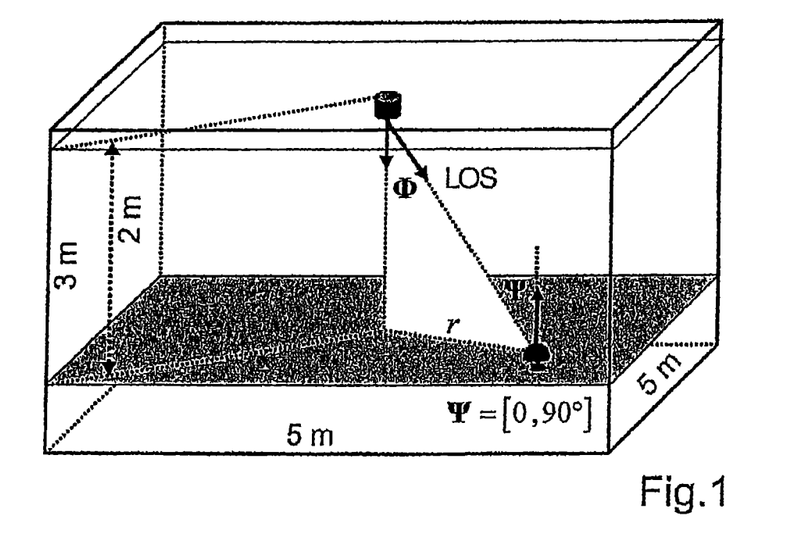
FIG. 1 depicts a small office comprising an infra-red data transfer system.

A typical application of a wireless infra-red transfer system is depicted in FIG. 1 in the form of a small office. The transmitter Tx is arranged in the centre of the ceiling, the receiver Rx may be arranged as desired, e.g. on a desk and may have any orientation complying with the line of sight LOS to the transmitter Tx. Such an arrangement comprising an undirected transfer channel advantageously allows for a diffuse as well as for a direct communication connection between the transmitter Tx and the receiver Rx. If a direct connection exists between them, the line of sight may be used for communication. If the direct connection is interrupted, the diffuse connection may maintain the communication at a reduced data rate.

The transfer function of the infra-red channel in such an undirected line of sight results in:

$$H(f) = \eta_{LOS} + H_{diff}(f) \qquad (1)$$

whereby $\eta_{LOS}$=portion of the line of sight with regard to the path amplitude attenuation which is as a rule independent from the modulation frequency f, and $H_{diff}(f)$=portion of diffuse reflexion in the room, which may be calculated by a first-order low pass function. It may be recognized that the channel response has a high dynamics in the frequency range which depends upon the power ratio between the line of sight and the diffuse signal. This dependency may be quantified by means of the K factor in dB whereby $K=20 \cdot \log(\eta_{LOS}/\eta_{diff})$, whereby $\eta_{diff}$ is the distribution of the diffuse connection with regard to the path amplitude attenuation.

Figure 2:
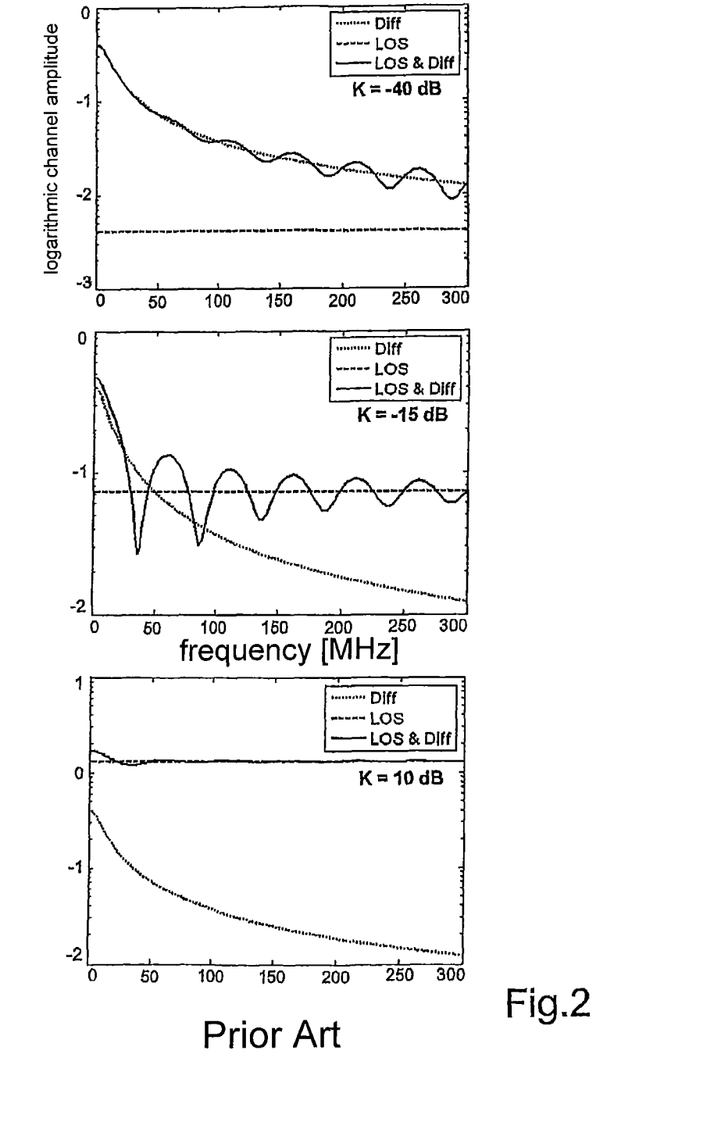
FIG. 2 shows a diagram of the frequency-dependent infra-red channel response for various K factors.

In FIG. 2, a channel dynamics comprising the parameters frequency and K factor is depicted for the office according to FIG. 1. The diagram shows the behaviour of the logarithmically scaled and standardized channel amplitude above the transfer frequency of various K factors. If the line of sight is blocked or very bad, the channel response approximates a low pass and the channel bandwidth is low. If the line of sight improves, the channel response varies strongly and shows breaks until it runs smoothly for a sufficient number of K factors and exhibits a bandwidth which is larger by a magnitude than in the diffuse case.

Figure 3:
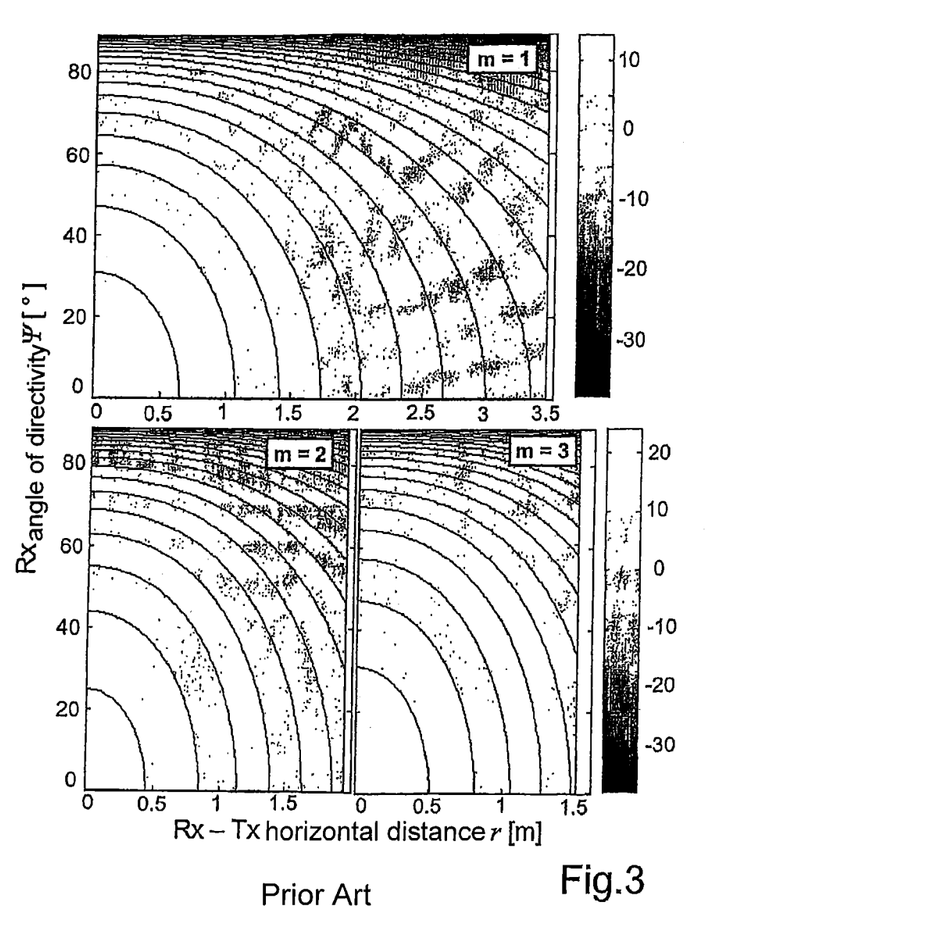
FIG. 3 shows a diagram of the K factor distribution for differing ranges and receiver orientations.

The scenario of FIG. 1 is selected in such a way that the values of the K factors are maintained for a real-time ambient condition. The distribution of the K factors in the room is depicted in FIG. 3 for three different values of the Lambert radiance index m in the transmitter Tx that determine the beam width $$\Phi_{max} = \arccos \sqrt[m]{1/2}$$

and limit the area of the line of sight if it is not blocked. FIG. 3 shows the behaviour of the K factor values depending on the horizontal distance r between the transmitter Tx and the receiver Rx and at the receiving angle of the directivity Ψ. It can be seen that the K factor range is larger with a better orientation of the transmitter Tx (larger m), however, the range for a potential line of sight becomes smaller, so that several transmitters would be required in order to reliably cover the room. It can also be seen from FIG. 3, that for m=1 for a transfer channel having moderate directivity a bad transfer only occurs in the corners of the room. Nevertheless, by means of the inventive method higher data rates may be achieved than for a diffuse channel. The increase of the K factor occurs more immediately for a more strongly directed transmitter Tx. At the same time, the directive angle to the receiver Rx is more critical than its distance to the transmitter Tx.

Figure 4:
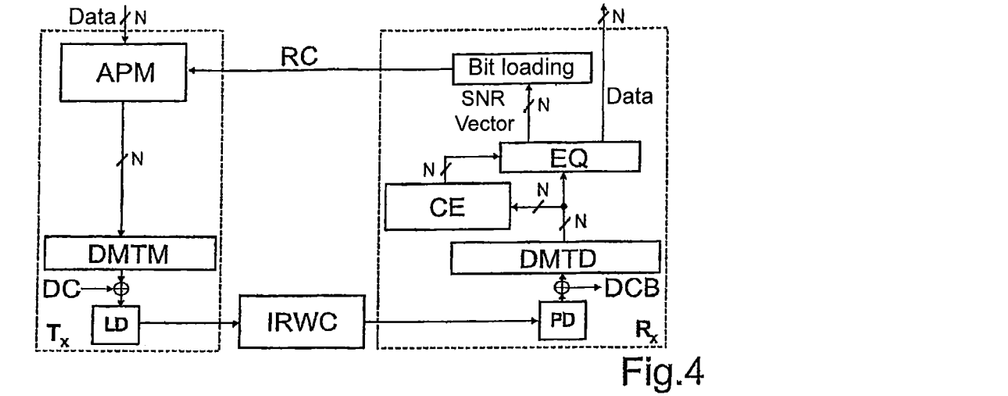
FIG. 4 depicts a block diagram of the method.

The basic block diagram for the inventive signal processing method is depicted in FIG. 4. According to FIG. 1, a communication between a transmitter Tx fixed to the ceiling of a room and a mobile receiver Rx is assumed. The electrical data signal data is divided up into N parallel streams at the transmitter Tx, the streams being subsequently modulated to a corresponding number N of sub-carriers in a suitable manner. The ideal modulation format for each sub-carrier is chosen in accordance with control information which is sent via a backchannel RC in the form of a vector of the modulation codes per sub-carrier at a low rate in the uplink from the mobile receiver Rx to the stationary transmitter Tx. Various modulation methods for optical signal transfer, such as BPSK, QPSK, OOK, LPPM are known from the prior art. After the adaptive primary modulation APM, the data symbols to be transferred are generated by digital signal processing DMTM. DMT modulation is well known from the prior art for conductor-bound electrical transfer channels. In the optical transfer channel, DMT is used for direct modulation of a light source LD. Prior to that, a common component DC is added to the processed signals in a further function block in order to correctly address the light source LD.

The modulated optical signals then reach the mobile receiver Rx after having been influenced by the optical transfer channel IRWC and the natural ambient light which causes noise. At the receiver Rx, a direct signal detection by means of a photo diode PC is at first carried out, and subsequently, the common component DC is eliminated, DCB, and a DMT demodulation, DMTD, is performed. Furthermore, all N sub-carriers are processed individually. A portion of the signal capacity is deducted for the channel estimate CE in each sub-carrier. Subsequently, the data are equalized, EQ, which may be effected by multiplying with the inverse channel coefficients. Different ways to achieve the channel estimate and the signal adjustment are generally and sufficiently known from the prior art. Furthermore, the current vector for the best modulation formats per sub-carrier are generated depending on the current channel status and sent to the transmitter Tx via the backchannel RC. Thereby, the vector may be generated as follows: the data equalization EQ yields a vector for the signal-to-noise rate SNR or for noise amplification, on the norm of which a suitable bit-loading scheme is implemented in order to define the bit number and the distribution of the signal power to each sub-carrier referring to the constellation conditions determining the modulation format and the alphabet size. Various bit-loading methods are also known from the prior art. Thereby, a modulation scheme having a larger bandwidth efficiency is used for a good subcarrier having a good channel attenuation and a relatively low noise increase, so that a large amount of information may be transferred. A bad sub-carrier, on the other hand, will only transfer little or no information. However, a transfer having a predetermined bit error rate may be realized in spite of the weakening of the channel. The backchannel RC may use the lowest sub-carrier still suitable for a transfer in order to realize the required feedback for realizing the adaptive system.

The capacity analysis of the sub-carriers for an optimal power distribution is carried out as follows. From the fact that in an infra-red system intensity modulation and direct detection are used, it follows directly that the electrical signal-to-noise rate SNR is in proportion to the square value of the mean value of the received optical power. The electrical signal-to-noise rate SNR is defined as the ratio from the electrical signal power $P_{el,R}$ and the electrical noise level $N_{el}$ at the receiver Rx, from which follows:

$$SNR = P_{el,R}/N_{el} = I_{ph}^2/\sigma^2 = R^2 \cdot P_{opt,R}^2/\sigma^2 = R^2 \cdot |H|^2 \cdot P_{opt,T}^2/\sigma^2, \quad (2)$$

whereby $I_{ph}$ is the generated photo-current, $\sigma^2$ is the noise variance, R is the receiver responsiveness, and $|H|$ is the amplitude of the channel frequency response, while the optical power at the receiver RX and at the transmitter Tx are designated by $P_{opt,R}$ and $P_{opt,T}$. Thereby, it is assumed that the electrical noise capacity is caused by backlight noise as the most significant contributor in the infra-red system (at 900 nm).

An infra-red system with N orthogonal sub-carriers may also be seen as a system consisting of N parallel independent Gaussian channels exhibiting independent noise. The entire system capacity (bits/transfer) according to the formulas of the Shannon information theory results from the sum of capacities of all sub-carriers, from which it follows after inserting equation (2):

$$C = \frac{1}{2}\sum_{i=1}^{N} \log_2(1 + SNR_i) = \frac{1}{2}\sum_{i=1}^{N} \log_2(1 + P_{opt,T,i}^2/\alpha_i), \quad (3)$$

whereby $P_{opt,T,i}^2$, $|H_i|$ and $\alpha_i = \sigma^2 \cdot R^{-2} \cdot |H_i|^{-2}$ represent the optical power, the amplitude of the channel response and the effective noise of the $i^{th}$ sub-carrier. Thereby, it is important to note that the term of the optical capacity according to equation (3) is squared. Thereby, a profound difference results in the capacity function between the optical channel and the radio channel, in which the corresponding term is not squared. This results in the demand for a specific power distribution scheme which is described in the following.

Infra-red transfer systems are dependent on security provisions (eye and skin protection) which determine an upper limit for the mean total power $P_{TOT}$ to be transferred by the transmitter Tx. The total power $P_{TOT}$ is now to be distributed to the independent sub-carriers in such a way that a maximum system capacity is achieved. Hereby, an optimizing problem known from the prior art occurs, which may be solved by means of Lagrangian factors.

In mathematical calculation, a vector $P=(P_1, P_2, \ldots, P_N)$ is to be determined in such a way that the N variable function C(P) is maximized according to equation (3) under the condition that $g(P) = \sum_{i=1}^{N} P_i - P_{TOT} = 0$. At first the Lagrangian function for $L(P) = C(P) - \lambda \cdot g(P)$ is formed, whereby $\lambda = const. \epsilon R$ is true for the Lagrangian factor. The optimized solution may then be obtained from a system of N equations $\partial L(P_i)/\partial P_i = 0$, $i=1 \ldots N$, which after some conversion results in:

$$P_i = \begin{cases} (\lambda \cdot \ln 4)^{-1} + \sqrt{(\lambda \cdot \ln 4)^{-2} - \alpha_i} & \text{if } \lambda \leq (\ln 4 \cdot \sqrt{\alpha_i})^{-1} \\ 0 & \text{otherwise,} \end{cases} \quad (4)$$

whereby "otherwise" means all other cases apart from the case mentioned in the first line.

Figure 5:
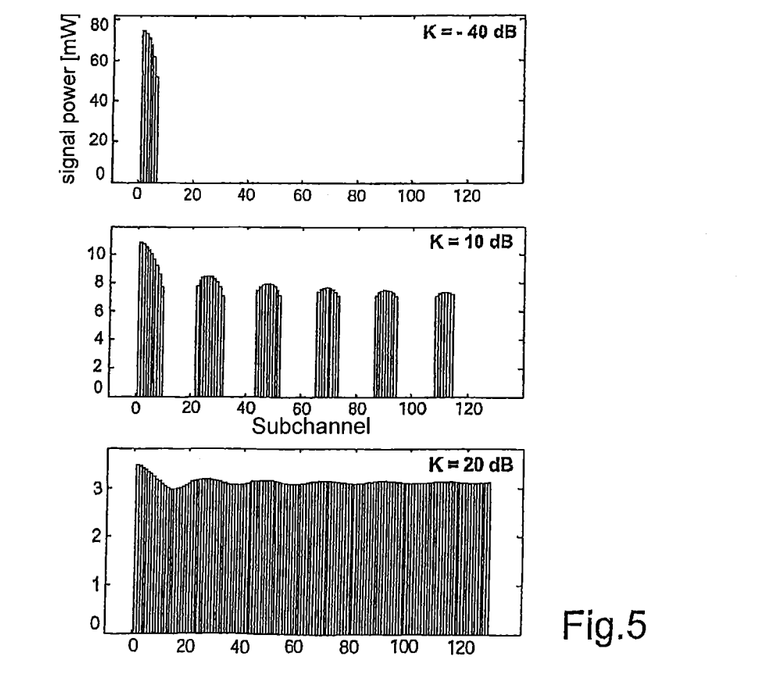
FIG. 5 shows a diagram for the optimal power distribution for different channel states.

The optimal power distribution for three different channel states (different K factors) is shown in FIG. 5. In a simulation, 128 sub-carriers were distributed over a bandwidth of 300 MHz, the Si-APD (at a factor M=100 and with a high assumed noise factor x=0.35) is assumed to have an effective total surface $A_R = 30$ mm$^2$. The optical power condition is determined at 900 nm in accordance with the security provisions for enhanced diffuse light sources at $P_{TOT} = P_{Tx} = 400$ mW. For an almost diffuse (having a low K factor) or diffuse transfer channel, it may be seen that the signal power is only distributed to the few first sub-carriers. If the channel behaviour is improved to obtain a larger bandwidth, increasingly more sub-carriers are filled with a low power and used for the transfer. K factors with a broad channel response result in a uniform power distribution to all sub-carriers.

Figure 6:
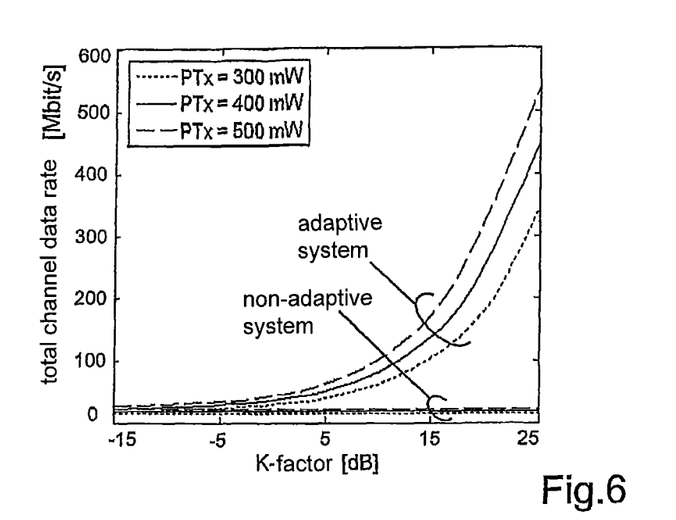
FIG. 6 shows a diagram of the entire maximum possible data rate depending on the K factor.

The potential data rates of an infra-red transfer system comprising the afore-described adaptive signal processing for three different values of the transfer performance $P_{Tx}$ are depicted in FIG. 6. As a comparison, graphs for a statistical sub-carrier system are shown in which a transfer in the entire room may be reliably ensured by means of a diffuse transfer channel. The advantages of the adaptive signal processing may be easily recognized if the K factors reach the 0 dB range and increase in such a manner that a significant increase of the data rate may be achieved for moderate values of the K factor. After achieving the K factors of 15 dB, the advantages increase even further. The difference between adaptive and non-adaptive signal processing is particularly noticeable for larger power values of the transmitter Tx. It may be determined that in a scaling according to FIG. 3 an optimal distribution of the potential data rates in a room according to FIG. 1 may be obtained for the results according to FIG. 6, as well.

Such an optimization is known for capacity maximizing in wireless radio channels and is referred to as "water filling principle". Thereby, the capacity is maximized according to $$C(P) = \frac{1}{2}\sum_{i=1}^{N} \log_2\left(1 + \frac{P_{el,T,i}}{\sigma^2/|H_i|^2}\right) = \frac{1}{2}\sum_{i=1}^{N} \log_2\left(1 + \frac{P_{el,T,i}}{\beta_i}\right) \quad (5)$$

with the electrical power condition $g(P)=\Sigma_{i=1}^{N}P_{i,el}-P_{TOT,el}=0$, which differs profoundly from the capacity function to be maximized in the infra-red channel and depends linearly upon the power. Since the capacity of an infra-red channel may be expressed as a function of the electrical signal power at the transmitter Tx, in the same manner as for a radio channel, it is obvious trying to achieve an optimal power distribution according to the water filling principle. However, it could be demonstrated that the ideal power distribution looks differently and that the water filling principle in the infra-red transfer, which is limited by the security provisions in the optical power, only leads to less-than-ideal power distributions. In the case of a transfer power beyond the security provisions, e.g. caused by the used hardware, the water filling principle leads to a maximum capacity utilization of the system, however, not to a maximum data rate. The optical conditions in an infra-red system thus have to be precisely considered. Then, an optimization of the system parameters may be carried out with respect to the number of sub-carriers, the choice of the suitable bit-loading systems and modulation formats, the sufficient level of the modulation, the degree of adaption etc. in order to achieve the theoretically maximum capacity in an infra-red transfer system.

By means of the method according to the invention, the transfer capacity of a wireless infra-red data transfer system may be maximized by means of a clever distribution of the entire optical transfer power to the sub-carriers. Thereby, however, the power distribution is carried out continuously and under the assumption of infinitesimally small information quanta and without taking modulation formats into account. Furthermore, an error-free transfer in the transfer channel is assumed. In practice, however, the information is expressed as bits. Moreover, the transfer channel is subject to interfering influences. Due to the channel dynamics, each sub-carrier is subjected to a particular equivalent channel noise at the receiver, which distorts the transferred signals and may lead to wrong decisions in the demodulation process. Thus, in order to consider real interfering influences in transfer systems, in practice a guaranteed transfer quality (QoS—quality of service) is defined, e.g. by determining a maximum tolerable error rate at the receiver (BER—bit error rate).

Figure 7:
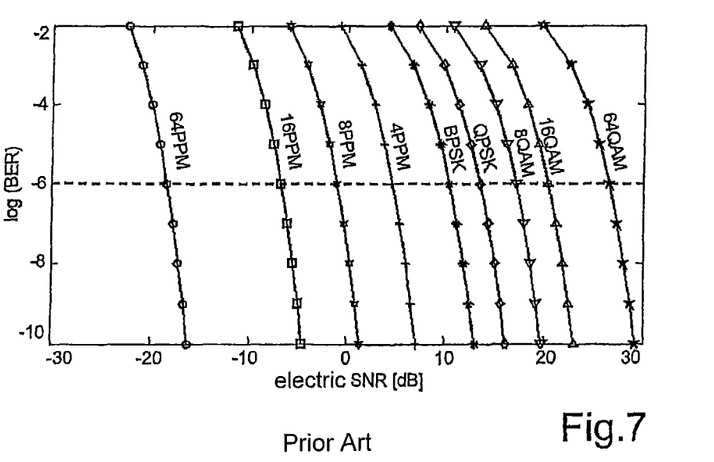
FIG. 7 shows a BER diagram for different modulation formats.

Therefore, in practice, the maximum transfer capacity achievable in the theoretical ideal case by means of the inventive dynamic data-rate adaptive signal processing method according to the invention may only be achieved by means of a deduction depending on the real implementing conditions. In practical use, the available optimal transfer power may only be distributed gradually. If the channel noise increases, either the symbol performance may be increased or the symbol complexity may be reduced in order to ensure the QoS. Since, however, an infra-red system is subject to a limitation of the optical transfer performance for security reasons, the symbol performance may not be increased ad lib. For this reason, the modulation format and thus, the data rate may be adjusted also in the real case under the assumption of interfering influences for each single sub-carrier depending on the currently occurring noise. The choice of the modulation format determines the complexity of the symbol constellation. Thereby, each symbol constellation requires a particular electrical signal-to-noise distance at the receiver in order to be transferable with a predetermined BER. In FIG. 7, various BER curves are plotted as parameters over the SNR with the modulation format in differing order. They may be derived from standard literature. In a DMT-based system, an M-PPM symbol is transferred over M-DMT symbols on the same sub-carrier and determines the minimum block length. In an adaptive transfer system, the sub-carriers having a good channel coefficient transfer more information (a modulation format with a higher complexity is chosen) than the sub-carriers having an inferior channel coefficient (a modulation format with a lower complexity is chosen).

In order to be able to maximize the data rate in the transfer channel under real conditions by means of the inventive signal processing method as well, specific bit-loading algorithms may thus be used which choose symbol constellations from a predetermined set and lead to a data-rate maximization taking into account performance limitations and interfering influences. Thereby, however, they do not take the theoretical optimal power distribution into account. Due to the discrete information allocation, bit-loading algorithms do not lead to a complete utilization of the entire power available, so that a small rest remains unused. For wired DSL systems, the bit-loading algorithm according to Krongold is known (cf. publication by B. S. Krongold, K. Ramchandran, D. L. Jones, "Computationally Efficient Optimal Power Allocation Algorithms for Multicarrier Communication Systems" IEEE Trans. On Communications, Vol. 48, No. 1 (2000), pp. 1018-1022). The Krongold algorithm uses the Lagrangian multiplication method for maximizing the gradual discrete function of the entire system throughput. Thereby, however, the electrical SNR and the electrical performance in a wired system depend upon each other in a linear manner. This bit-loading algorithm optimal for wired DSL systems may be conferred to the inventive signal processing method in a wireless infra-red data transfer system. However, thereby it has to be taken into account that the electrical SNR and the optical performance depend upon each other in a squared manner, and that in the case of smaller channel performance the efficient PPM technique (cf. FIG. 7) is particularly required.

Figure 8:
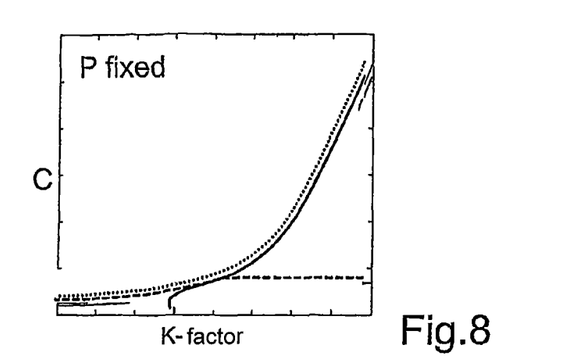
FIG. 8 depicts a diagram of the channel capacity depending on the channel state.

FIG. 8 shows a diagram of the channel capacity C as the total theoretically achievable data rate depending on the real channel state for an indoor infra-red system. The real channel state is also described by means of the K factor which results from the ratio between the LOS and the diffuse component for a predetermined geometrical arrangement on transmitter and receiver in the room. Due to the choice of modulation formats, it should be possible to sufficiently retrace the curve C. Since, however, in the real case the power is discreetly distributed to the sub-carriers due to information quantization, no modulation format may be found fulfilling these conditions. Rather, the PPM modulation format follows the capacity curve C in the region of bad channels (channel states) having a low K factor, however, it then remains constant from a relatively low transfer capacity C onward (PPM curve). The QAM modulation format is very suitable for good channels, it overlaps with the PPM modulation format and becomes zero for inferior channels (curve QAM). If the more complex modulation format is used for bad channels, this leads to an interruption of the transfer, and if less complex modulation formats are used for good channels, this leads to an interruption of the channel and smaller data rates than would be possible are transferred. Thus, in this approach a simultaneous use of several suitable modulation formats is obvious.

| i | 1 | 2 | 3 | 4 | 5 | 6 |
|---|---|---|---|---|---|---|
| $MF_i$ | 16 PPM | 4 PPM | BPSK | QPSK | 16 QAM | 64 QAM |
| $R_i$ [bits/symbol] | ¼ | ½ | 1 | 2 | 4 | 6 |
| SNR [dB] @ BER = $10^{-6}$ | −6.82 | 4.76 | 10.53 | 13.54 | 20.42 | 26.56 |

The above table 1 shows the spectral efficiency $R_i$ (number of bits per DMT symbol transferred on the $i^{th}$ sub-carrier) and the required SNR in dB for various modulation formats MF with an assumed BER of $10^{-6}$. It may be seen that for inferior channels the PPM modulation format is more suitable, while for better channels the QAM modulation format (having QPSK=4 QAM) is particularly appropriate. (Annotation: the nature of the BPSK modulation format is related to the QAM modulation format and may thus be counted accordingly.) Depending on the chosen order, any number of bits per symbol starting from two bits may be transferred by means of the QAM modulation format. The PPM modulation format, which completely differs from the QAM modulation format, may allow for the transfer of fractions of a bit per DMT symbol. Thus, the case may occur that one M-PPM symbol is transferred over several MDMT symbol periods.

Figure 9A:
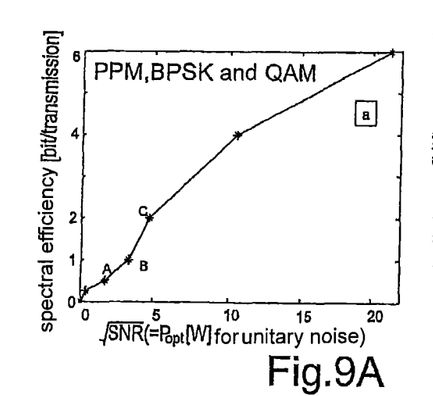
FIG. 9A shows an OPC diagram for an IR channel.

In FIG. 9A, the values according to table 1 are shown above the required optical performance under the assumption of unified noise (unity noise=1). The curve resulting from the connection of individual points shows the operational characteristics of the transfer system. In an infra-red transfer system, this corresponds to the quotient from the spectral efficiency and the square root of SNR, since the electrical SNR and the optical power depend upon each other in a square manner.

Figure 9B:
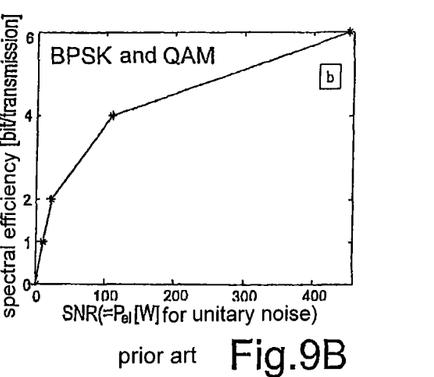
FIG. 9B shows an OPC diagram for a DSL channel.

In comparison thereto, FIG. 9B shows the OPC of the Krongold algorithm which is ideal for the wired DSL. The OPC shows a concave devolution with equidistant sections. The OPC for infra-red, on the other hand, is not concave and does not have any equidistant sections. Since, however, the Krongold algorithms for DSL systems obtains an ideal result, the conclusion may be drawn for infra-red systems that herein the ideal OPC should also run concavely and have equidistant sections. On the other hand, however, in the case of infra-red systems the completely different modulation formats PPM and QAM have to be taken into account (Krongold uses only one format in different order). In an infra-red system, the Krongold bit-loading algorithm may be implemented by fulfilling the ideal criteria, i.e. only between two subsequent and separate steps.

A realization of a bit-loading method for concretely choosing the modulation format may be configured in such a way that in a first step A only the QAM modulation format and in a second step B only the PPM modulation format is used. The possibilities of the respective other modulation method are not considered in both steps. Sub-carriers which have already been detected by means of one modulation format, are not considered after allocation of all sub-carriers for a better redistribution of the total power with a still low portion of used power.

The distribution of the optical signal power and of the bits under real operating conditions may thus be performed after continuing the inventive signal processing method as follows by means of a two-step bit-loading algorithm:

step A by means of a QAM modulation format comprising a selection of the symbol constellations from the set [0, 2, 4, 6] on N sub-carriers with the optical signal power being sufficiently present in this sub-carrier, and step B by means of a PPM modulation format comprising a selection of the symbol constellations from the set [0, ¼, ½] on the sub-carriers which after performing step A are still free due to a too low existing optical power using the optical signal power still remaining after performing step A.

Figure 10:
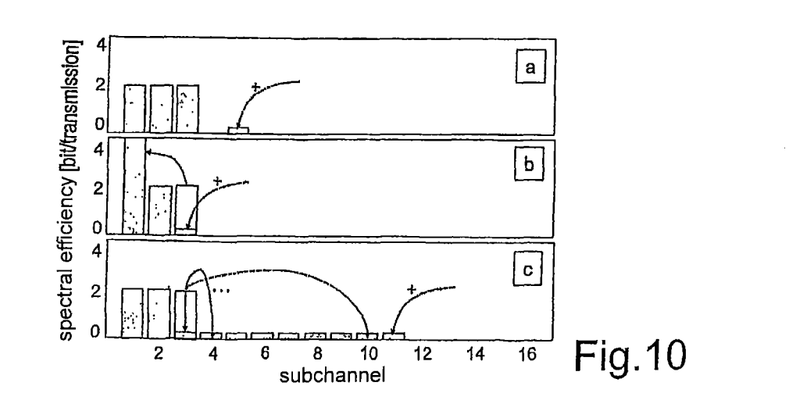
FIG. 10 depicts an example for various bit distributions for the two-step bit-loading algorithm.

In the two-step bit-loading algorithm, however, both modulation formats are considered completely independently from each other. It is assumed that $\{N_{QAM}\}=\{N\}$ (thereby, the parentheses show that N does not only refer to the number, but also to the set of sub-carriers) and that with regard to the optical performance $P_{QAM}=P_{TOT}$. At first, all energetically available sub-carriers are occupied by the QAM modulation format, the subsequently still remaining, less energetic sub-carriers are then modulated by the PPM modulation format. Thus, no cases may be taken into account for the bit distribution for a maximum data rate in which e.g. a distribution to several sub-carriers having a low order of complexity requires less power than occupying only some sub-carriers having a higher order (cf. FIG. 10, case a is achieved by means of the two-step bit-loading algorithm, the cases b and c, which may allow for a more advantageous performance distribution and may thus achieve a higher transfer rate, are not taken into account). In order to take such cases into account, an occupation of each sub-carrier with the QAM or the PPM modulation format of differing orders while at least maintaining the maximum data rate achievable by means of the QAM modulation format has to be considered. When choosing the symbol constellation ideally adjusted to the respective sub-carrier from a predetermined set of symbol constellations of the PPM or the QAM method, the effects of this selection on the distribution of the optical power are taken into account under real conditions.

A continuation of the signal processing method according to the invention by implementing a bit-loading algorithm for a bit and power distribution on the sub-carriers under real conditions may thus provide an examination of the influence of the chosen system constellation according to step A and B on the degree of utilization of the optical signal power and thus on the latter's distribution to the individual sub-carriers; this is carried out by consistently modulating, starting from step a, one sub-carrier more with a PPM modulation format and by detecting the resulting redistribution of the optical signal performance, until a discreet distribution is detected by means of a maximum utilization of the optical power, whereby the data rate achieved in step A is respectively obtained by choosing different orders of the QAM modulation format and distributed to the remaining sub-carriers. Compared to the two-step bit-loading algorithm, this algorithm may be referred to as "ideal bit-loading algorithm", since it indicates the ideal performance distribution for the infra-red channel.

Thereby, it is assumed that $\{N_{QAM}\}+\{N_{PPM}\}=\{N\}$ and $P_{QAM}+P_{PPM}=P_{TOT}$. If the two parameters $N_{QAM}$ and $P_{QAM}$ have been found, the parameters $N_{PPM}$ and $P_{PPM}$ result accordingly. In the required iteration calculation, a vector V is calculated in every cycle of the optimal bit-loading algorithm. This vector comprises all intermediate and final results considering both modulation methods, the solution matrix has the size of 2N and comprises N columns for the sub-carriers and two rows for the spectral efficiency and the performance per sub-carrier.

Figure 11:
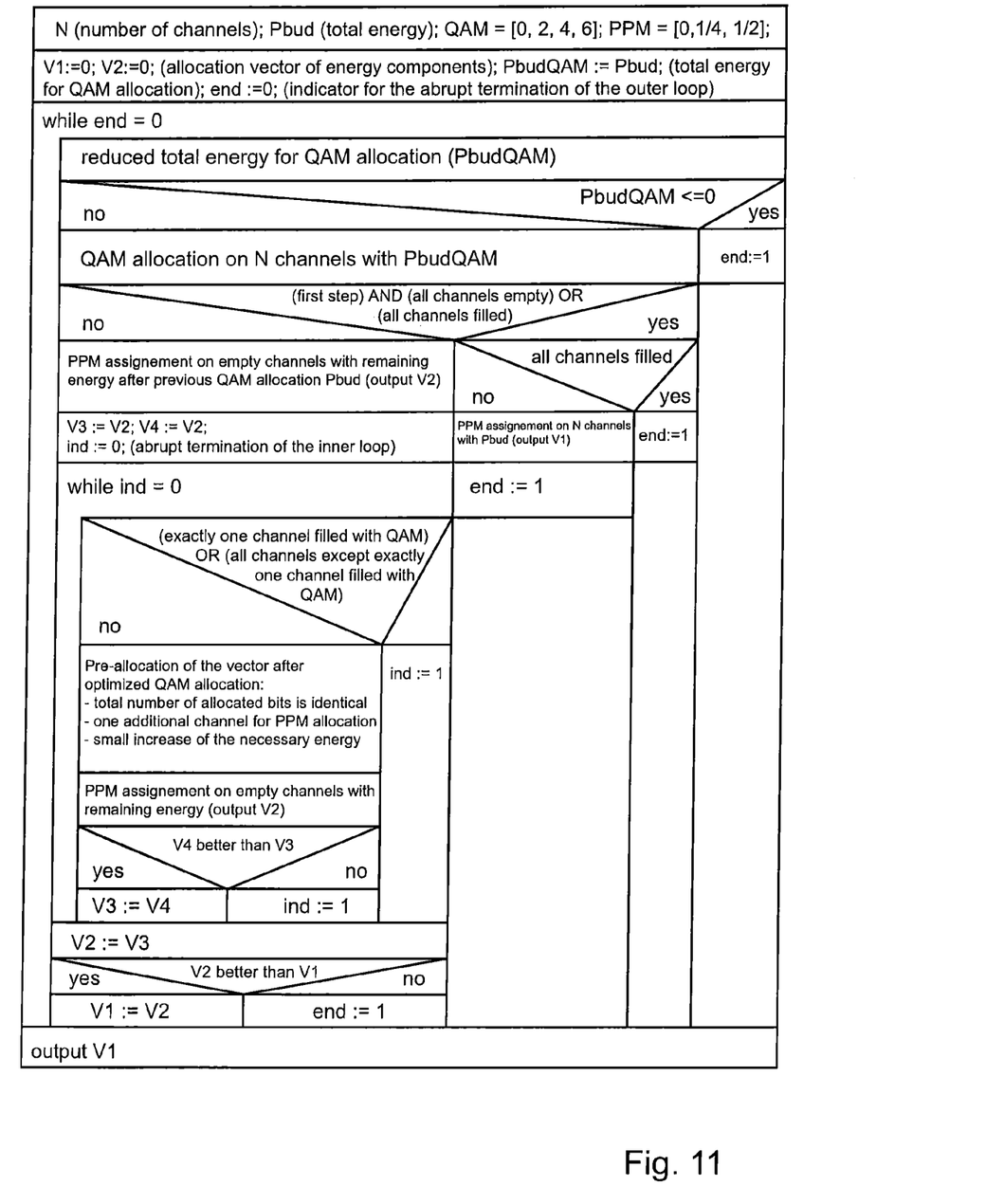
FIG. 11 shows a flow chart for an optimal bit-loading algorithm.

The optimal bit-loading algorithms consists of an external and of an internal loop. In the external loop, the admissible power, and in the internal loop, the sub-carriers for the QAM modulation format are determined as parameters. In the internal loop, at first an optimal distribution to the sub-carriers is carried out by means of the QAM or PPM modulation format for each assumed $P_{QAM}$. Thereby, the iteration calculation is started with the assumption that $P_{QAM}=P_{TOT}$. In an internal loop, the calculation is gradually reduced per cycle and a new respective vector V is calculated. Thereby, each vector is at first calculated out according to the above explained two-step bit-loading algorithm after at first selecting the QAM modulation format for all powerful channels and the PPM modulation format for all residual channels. The detected vector is then gradually redistributed in each iteration cycle by maintaining the data rate achieved by means of the QAM modulation format in such a way that one sub-carrier more is occupied in the PPM modulation format, respectively. If it turns out that the new vector causes a higher data rate or the same data rate at a lower power demand, a further cycle is started based on this vector, in which a further sub-carrier is occupied with the PPM modulation format. If the calculated new vector is not better than the old one, the first calculated vector is used as the final result and the iteration is terminated. Only if the iteration shows that the bit and power distribution is ideal for all sub-carriers, so that the highest data rate is achieved and only a minimal rest of the optical power available remains unused, the respective symbol constellation of the selected modulation method is finally used and the external loop with the calculation of the total power for the sub-carriers occupied with the QAM modulation method is finished. A flow chart of the above-described optimal bit-loading algorithm is depicted in FIG. 11.

However, a comparison of the two-step bit-loading algorithm and the optimal bit-loading algorithm has shown that the two-step algorithm yields very satisfactory results in practice. Apart from that, it has the great advantage that it can be implemented in real-time whereas the optimal bit-loading algorithm requires a relatively long calculating time.

REFERENCE LIST

APM adaptive primary modulation
CE channel estimate
data electrical data signal
DC common component
DCB elimination of common component
DMTD DMT demodulation
DMTM digital signal processing (DMT modulation)
EQ data equalization
IRWC optical transfer channel
LD light source
N number of sub-carriers
P signal power
PD photo diode
RC back channel
Rx mobile receiver
Tx stationary transmitter

The invention claimed is:

1. Method for the transfer of a data signal from a stationary transmitter to a mobile receiver or vice versa, said method comprising the following steps:

dividing a first electrical data signal into a number N of parallel data signal streams, modulating each of said parallel data signal streams to an orthogonal electrical sub-carrier, said sub-carriers having different frequencies, converting said plurality of parallel data signal streams to an electrical second serial data signal stream, using said second serial data signal stream for modulating the intensity of an infra-red light source, receiving an optical signal of said infra-red light source by use of a receiver and converting said optical signal back to said second serial data signal stream, demodulating said number N of parallel data signal streams from said second serial data signal stream, processing each of said parallel data signal streams separately, using at least one sub-carrier as a backchannel from the receiver to the transmitter in order to transfer control information concerning the current transfer quality and data rate of each sub-carrier, adapting the amount of data sent to each of said parallel data signal streams and the modulation method of each of said orthogonal electrical sub-carriers according to the transfer quality of the respective sub-carrier wherein the in-band sub-carrier with the lowest sub-carrier frequency is regularly used as a backchannel from the receiver to the transmitter in order to transfer control information concerning the current transfer quality and the current data rate of each sub-carrier.

2. Method according to claim 1, wherein converting said plurality of parallel data signal streams to a second serial data signal stream is done by means of a DMT modulation.

3. Method according to claim 1, wherein the receiver is adapted to demodulate said number N of parallel data signal streams from said second serial data signal stream by means of a DMT demodulation.

4. Method according to claim 1, wherein control information concerning the current transfer quality and data rate of each sub-carrier comprises the signal-to-noise-rate estimated from an equalizer used for processing each of said parallel data signal streams at said receiver.

5. Method according to claim 1, wherein the amount of data sent to each of said parallel data signal streams is adapted by means of a two-step bit-loading algorithm comprising the steps of:

assigning a QAM modulation format on a subset of said N sub-carriers with the optical signal power being sufficiently present in this sub-carriers, said QAM modulation format comprising a selection of the symbol constellations from the set [0,2,4,6], and assigning a PPM modulation format on the sub-carriers which after assigning a QAM modulation are still free, said PPM modulation format comprising a selection of the symbol constellations from the set [0,1/4,1/2].

6. Method according to claim 5, wherein the influence of the selected symbol constellations following from the chosen assignment of a QAM or a PPM modulation on the degree of utilization of the optical signal power available is examined by consistently modulating one more sub-carrier by means of a PPM modulation format and detecting the resulting redistribution of the optical signal power while maintaining the data rate, until a predetermined data rate is achieved with minimum optical power or a maximum data rate is achieved using a predetermined optical power.

7. A system for the transfer of a data signal from a stationary transmitter to a mobile receiver or vice versa, said system comprising:
   a stationary transmitter adapted to receive a first electrical data signal and being intended to divide said first data signal into a number N of parallel data signal streams and modulate each of said parallel data signal streams to an orthogonal electrical sub-carrier, wherein the amount of data sent to each of said parallel data signal streams and the modulation method of each of said orthogonal electrical sub-carriers is adapted according to the transfer quality of the respective sub-carrier,
   said transmitter being further adapted to convert said plurality of parallel data signal streams to an electrical second serial data signal stream and use said second serial data signal stream for modulating the intensity of an infra-red light source,
   said transmitter comprising further a receiver in order to receive control information concerning the current transfer quality and data rate of each sub-carrier; and
   a mobile receiver adapted to receive an optical signal of said infra-red light source and converting said optical signal back to said second serial data signal stream,
   said mobile receiver further being adapted to demodulate said number N of parallel data signal streams from said second serial data signal stream and being able to process each of said parallel data signal streams separately,
   said receiver comprising further an optical transmitter in order to transfer control information concerning the current transfer quality and data rate of each sub-carrier, using at least one sub-carrier as a backchannel, wherein said optical transmitter is adapted to use the in-band sub-carrier with the lowest sub-carrier frequency as a backchannel from the receiver to the transmitter in order to transfer control information concerning the current transfer quality and the current data rate of each sub-carrier.

8. System according to claim 7, wherein the transmitter is adapted to convert said plurality of parallel data signal streams to a second serial data signal stream by means of a DMT modulation.

9. System according to claim 7, wherein said receiver is adapted to use the sub-carrier with the lowest sub-carrier frequency as a backchannel from said receiver to said transmitter.

10. System according to claim 7, wherein said receiver comprises further an equalizer used for processing each of said parallel data signal streams which is adapted to gather control information concerning the current transfer quality and data rate of each sub-carrier.

11. A stationary transmitter adapted to receive a first electrical data signal and being intended to divide said first data signal into a number N of parallel data signal streams and modulate each of said parallel data signal streams to an orthogonal electrical sub-carrier, wherein the amount of data sent to each of said parallel data signal streams and the modulation method of each of said orthogonal electrical sub-carriers is adapted according to the transfer quality of the respective sub-carrier,
   said transmitter being further adapted to convert said plurality of parallel data signal streams to an electrical second serial data signal stream and use said second serial data signal stream for modulating the intensity of an infra-red light source,
   said transmitter comprising further a receiver in order to receive control information concerning the current transfer quality and data rate of each sub-carrier, wherein said receiver being part of the transmitter is adapted to receive the in-band sub-carrier with the lowest sub-carrier frequency as a backchannel from a mobile receiver to the transmitter in order to transfer control information concerning the current transfer quality and the current data rate of each sub-carrier.

12. Transmitter according to claim 11, wherein the transmitter is adapted to convert said plurality of parallel data signal streams to a second serial data signal stream by means of a DMT modulation.

13. Transmitter according to claim 11, configured to adapt the amount of data sent to each of said parallel data signal streams by means of a two-step bit-loading algorithm comprising the steps of:
   assigning a QAM modulation format on a subset of said N sub-carriers with the optical signal power being sufficiently present in this sub-carriers, said QAM modulation format comprising a selection of the symbol constellations from the set [0,2,4,6], and
   assigning a PPM modulation format on the sub-carriers which after assigning a QAM modulation are still free, said PPM modulation format comprising a selection of the symbol constellations from the set [0,1/4,1/2].

14. Transmitter according to claim 13, adapted to examine the influence of the selected symbol constellations following from the chosen assignment of a QAM or a PPM modulation on the degree of utilization of the optical signal power available by consistently modulating one more sub-carrier by means of a PPM modulation format and detecting the resulting redistribution of the optical signal power while maintaining the data rate, until a predetermined data rate is achieved with minimum optical power or a maximum data rate is achieved using a predetermined optical power.

15. A mobile receiver adapted to receive an optical signal of an infra-red light source and converting said optical signal back to a second serial data signal stream,
   said mobile receiver further being adapted to demodulate from said second serial data signal stream a number N of parallel data signal streams, each of the parallel data signal streams being modulated to a respective orthogonal electrical sub-carrier, said sub-carriers having different frequencies, wherein said mobile receiver is able to process each of said parallel data signal streams separately,
   said receiver comprising further an optical transmitter being adapted to transfer control information concerning the current transfer quality and data rate of each sub-carrier, using at least one in-band sub-carrier as a backchannel, wherein said optical transmitter is adapted to use the in-band sub-carrier with the lowest sub-carrier frequency as a backchannel from the receiver to the transmitter in order to transfer control information concerning the current transfer quality and the current data rate of each sub-carrier.

16. Receiver according to claim 15, which is adapted to demodulate said number N of parallel data signal streams from said second serial data signal stream by means of a DMT demodulation.

17. Receiver according to claim 15, which is adapted to use the sub-carrier with the lowest sub-carrier frequency as a backchannel from said receiver to said transmitter.

18. Receiver according to claim 15, which comprises further an equalizer used for processing each of said parallel data signal streams which is adapted to gather control information concerning the current transfer quality and data rate of each sub-carrier.

* * * * *